US010569752B2

(12) United States Patent
    Tagesson

(10) Patent No.: US 10,569,752 B2
(45) Date of Patent: Feb. 25, 2020

(54) DRIVER ASSISTANCE SYSTEM

(71) Applicant: VOLVO TRUCK CORPORATION, Göteborg (SE)

(72) Inventor: Kristoffer Tagesson, Göteborg (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 9 days.

(21) Appl. No.: 15/571,303

(22) PCT Filed: Jun. 5, 2015

(86) PCT No.: PCT/EP2015/062545
§ 371 (c)(1),
(2) Date: Nov. 2, 2017

(87) PCT Pub. No.: WO2016/192806
PCT Pub. Date: Dec. 8, 2016

(65) Prior Publication Data
US 2018/0354476 A1   Dec. 13, 2018

(30) Foreign Application Priority Data

Jun. 1, 2015 (EP) .................................... 15170180

(51) Int. Cl.
*B60T 8/17* (2006.01)
*B60T 8/1764* (2006.01)
(Continued)

(52) U.S. Cl.
CPC .......... *B60T 8/1764* (2013.01); *B60T 8/1755* (2013.01); *B60W 10/188* (2013.01); *B60W 10/20* (2013.01); *B60W 30/02* (2013.01); *B60W 30/18172* (2013.01); *B62D 5/0463* (2013.01); *B62D 6/00* (2013.01); *B60T 2210/124* (2013.01); *B60T 2220/00* (2013.01); *B60T 2220/03* (2013.01); *B60T 2220/04* (2013.01);
(Continued)

(58) Field of Classification Search
CPC ..................................................... B60T 8/1764
See application file for complete search history.

(56) References Cited

U.S. PATENT DOCUMENTS 2,564,766 A * 8/1951 Oberman ................. H04Q 1/18
                                                     340/13.2
8,565,993 B2 * 10/2013 Lu .......................... B60T 8/1755
                                                     701/29.2
(Continued)

FOREIGN PATENT DOCUMENTS

CN   101778753 A   7/2010
CN   102470836 A   5/2012
(Continued)

OTHER PUBLICATIONS

International Search Rerport (dated Jan. 21, 2016) for corresponding International App. PCT/EP2015/062545.
(Continued)

*Primary Examiner* — Alex C Dunn
(74) *Attorney, Agent, or Firm* — Venable LLP; Jeffri A. Kaminski

(57) ABSTRACT

A method for controlling a driver assistance system is provided, as is a corresponding driver assistance system and a computer program product.

16 Claims, 2 Drawing Sheets

(51) Int. Cl.
  *B60T 8/1755* (2006.01)
  *B60W 10/188* (2012.01)
  *B60W 10/20* (2006.01)
  *B60W 30/02* (2012.01)
  *B60W 30/18* (2012.01)
  *B62D 5/04* (2006.01)
  *B62D 6/00* (2006.01)

(52) U.S. Cl.
  CPC ..... *B60T 2250/03* (2013.01); *B60T 2260/024* (2013.01); *B60T 2270/10* (2013.01); *B60T 2270/304* (2013.01); *B60W 2510/20* (2013.01); *B60W 2520/14* (2013.01); *B60W 2540/12* (2013.01); *B60W 2540/26* (2013.01); *B60W 2550/148* (2013.01); *B60W 2710/18* (2013.01); *B60W 2710/20* (2013.01)

(56) References Cited

U.S. PATENT DOCUMENTS

| | | | | |
|---|---|---|---|---|
| 9,598,074 B2* | 3/2017 | Honda | ............... | B60T 8/1755 |
| 2003/0028308 A1* | 2/2003 | Ishikawa | ............... | B60T 8/1764 |
| | | | | 701/71 |
| 2004/0099469 A1* | 5/2004 | Koibuchi | ............... | B60T 8/175 |
| | | | | 180/421 |
| 2004/0201272 A1* | 10/2004 | O'Dea | ............... | B60T 8/1755 |
| | | | | 303/146 |
| 2005/0033517 A1* | 2/2005 | Kondoh | ............... | B60K 26/021 |
| | | | | 701/301 |
| 2009/0192679 A1* | 7/2009 | Kobayashi | ............ | B62D 5/0463 |
| | | | | 701/42 |
| 2009/0248249 A1* | 10/2009 | Park | ............... | B60T 8/1755 |
| | | | | 701/42 |
| 2009/0248250 A1* | 10/2009 | Yasui | ............... | B62D 6/003 |
| | | | | 701/42 |
| 2012/0199414 A1* | 8/2012 | Shimizu | ............... | B62D 5/0463 |
| | | | | 180/446 |
| 2012/0271516 A1* | 10/2012 | Takahashi | ............ | B62D 5/0466 |
| | | | | 701/42 |
| 2013/0173127 A1* | 7/2013 | Nakatsu | ............... | B60L 3/102 |
| | | | | 701/70 |
| 2013/0184955 A1* | 7/2013 | Kobayashi | ............ | B60T 8/1764 |
| | | | | 701/72 |
| 2013/0226408 A1* | 8/2013 | Fung | ............... | B60W 40/09 |
| | | | | 701/41 |
| 2013/0245909 A1* | 9/2013 | Hirose | ............... | B60T 8/1764 |
| | | | | 701/73 |
| 2013/0261894 A1* | 10/2013 | Kojima | ............... | B62D 5/0463 |
| | | | | 701/41 |
| 2013/0338878 A1* | 12/2013 | Fritz | ............... | B60W 10/18 |
| | | | | 701/41 |
| 2014/0330501 A1* | 11/2014 | Watanabe | ............ | B60T 8/1755 |
| | | | | 701/90 |
| 2017/0090478 A1* | 3/2017 | Blayvas | ............... | G01C 21/3453 |

FOREIGN PATENT DOCUMENTS

| | | |
|---|---|---|
| CN | 203496874 U | 3/2014 |
| CN | 104540701 A | 4/2015 |
| DE | 10163967 A1 | 7/2003 |
| DE | 102010012497 A1 | 9/2011 |
| DE | 102010033496 A1 | 2/2012 |
| DE | 102011116301 A1 | 4/2012 |
| FR | 2861043 A1 | 4/2005 |
| WO | 2005063538 A1 | 7/2005 |

OTHER PUBLICATIONS

Chinese Office Action dated Sep. 23, 2019 in corresponding CN Application No. 201580080497.5, 16 pages.

* cited by examiner

DRIVER ASSISTANCE SYSTEM

BACKGROUND AND SUMMARY

The invention relates to a method for controlling a driver assistance system. The invention also relates to a corresponding driver assistance system and a computer program product.

Recent advances in assisting a driver operating a vehicle have successfully emerged into the market as they compensate shortcomings of human drivers, such as inevitable reaction times for emergency brakes and/or deficiencies for vehicle stabilization. The anti-lock braking system (ABS) and the electronic stability program (ESP) used in modern vehicles are two technologies for assisting the driver during a critical operational situation.

In the event that the vehicle is braking, under some conditions the forces that are generated can result in unwanted reaction forces being applied to the vehicle and the steering system. At best these may just be felt through the wheel, as a mild disturbance, which gives an uncomfortable and possibly alarming feel to the driver. At worst, the forces can unbalance the vehicle causing it to spin out of control and possibly disturb the driver with a heavy steering wheel torque disturbance.

One situation in which this can occur is known as a split-friction braking event, also known as split-mu, where the coefficient of friction is different at the two vehicle sides. The braking force in such an event may be substantially different between left and right vehicle sides. This asymmetry and imbalance of the effective brake forces on the right and the left vehicle sides will generate a yaw torque that turns the vehicle about its vertical axis depending on these asymmetric forces. To counteract this condition and preserve the directional and driving stability, i.e. to keep the vehicle on course, the driver would have to manipulate the steering wheel in this situation with an extremely quick reaction for correcting purposes.

The yaw torque may be limited by reducing the brake force, which will result in an unwanted increase in stopping distance for the vehicle. There is thus a necessity to balance the applied brake forces, at the different wheels, in such a manner that the driving stability is maintained while at the same time reducing the stopping distance. However, priority is generally given to the preservation of the directional and driving stability as well as the steerability of the vehicle over reaching shortest possible stopping distance.

There is thus a desire to provide means for further reducing the stopping distance while keeping driving stability. EP1209053 provides some relief to this problem by suggesting an electric steering control strategy to assist the driver in controlling the vehicle during a split-mu braking operation. A correction angle of deflection of the steered wheels is calculated to compensate for the yaw torque for maintaining the vehicle in its path. The correction angle is then used for controlling an engine of the electric power steering and hence the steering wheel. Accordingly, driver feels, and is encouraged, to turn the steering wheel to compensate for the unwanted yaw torque.

Even though EP1209053 provides for reducing the stopping distance while keeping driving stability, it would be desirable to introduce an improved methodology for assisting the driver of a vehicle during a split-mu braking event, where the methodology takes the driver situation and operation further into account.

According to an aspect of the invention, a method is provided for controlling a driver assistance system that includes a brake support function of a vehicle, the method comprising the steps of receiving an indication of a difference in road friction between a left and a right wheel of a plurality of wheels of the vehicle, receiving an indication of a level of driver reaction to a braking action, the braking action performed by applying a predetermined brake pressure to the plurality of wheels of the vehicle, and determining an adjusted brake pressure based on the difference in road friction and the driver reaction level.

In accordance with an aspect of the invention, a correlation is made between a difference in road friction and how a driver is reacting to a braking action, where the result of the correlation will result in a request for an adjustment of the brake pressure. As an example, this means that in case the braking action results in a yaw torque that turns the vehicle about its vertical axis because of a current difference in friction, the braking action can be adjusted to take into account the action taken by the driver. The inventor has shown that the stopping distance is very much affected by the capability of the driver to handle the lateral disturbance. In general the capability of the driver to handle disturbances should be estimated in real-time, considering driver mental state.

Thus, in case the driver is counteracting the yaw torque, the brake pressure can be increased, typically shortening the stopping distance. However, in case the driver is not or only slightly counteracting the yaw torque, the brake pressure may be adapted to focus on keeping the vehicle as straight as possible, however with a possible (in comparison) longer stopping distance. The invention may typically be implemented in relation to an automated or semi-automated braking function for the vehicle. Alternatively, or also, the invention may be implemented as a response to a manual braking imitated by the driver. The adjusted brake pressure is preferably further based on an allowed yaw disturbance for the vehicle, typically based on current thereto related legislations.

In an embodiment of the invention, the predetermined brake pressure is determined based on an indication of a level of driver alertness. Accordingly, it may be possible to allow the initial brake pressure (when automatically performing a braking action) to depend on an indication of how alert the driver is. The expectation is that the driver would be more likely to be prepared to counteract the yaw torque in case he is determined to be alert, and less likely to be able to counteract the yaw torque in case of being less alert. For example, a "sleepy" driver is likely not as responsive as if the driver just had a pause from driving the vehicle. It could be possible, and within the scope of the invention, to allow an alertness level to directly correspond to the brake pressure, however it could also be possible to allow for the brake pressure to be somewhat functionally amplified for higher alertness levels. In a possible embodiment of the invention a driver drowsiness detection system is comprised with the vehicle and continuously provides information as to a current level of driver alertness for the driver.

Preferably, the driver reaction level includes at least one of an indication of a driver operation of a driver steering device or a brake pedal of the vehicle. Thus, and as indicated above, in case the driver is actively working for counteracting the yaw torque, by e.g. rotation of a steering wheel, this may be seen as an indication of an in comparison high level of driver reaction. Similarly, in case the driver is actively using the brake pedal for retarding the vehicle, this is in accordance with the invention ranking as an active driver, thus scoring an in comparison high level of driver reaction. In comparison, in case the driver is refraining from using the steering wheel and/or the brake pedal, this would be scoring as an in comparison low level of driver reaction. The expression driver steering device should be interpreted broadly, including e.g. the above mentioned steering wheel and/or any other type of levers and/or similar for adjusting a direction of the vehicle. The expression brake pedal should similarly be interpreted broadly, and may not necessarily relate to a device for receiving a pressure by a foot of the driver. Rather, any type of levers or similar for achieving a manual brake force is to be understood as included.

In a preferred embodiment of the invention, the brake pressure is continuously adjusted during the braking action. Accordingly, the adjustment will continuously be dependent on any changes as the difference in road friction and/or to the driver reaction. Thus, in implementing the inventive concept it may be possible to compensate for a somewhat slow reacting driver, i.e. even in case the driver didn't react immediately to the generated yaw torque, once the driver is in fact reacting, the brake pressure may be adjusted accordingly. Similarly, in case the difference in road friction is changing, over the road travelled, the brake pressure may be adjusted. It is preferred to determine and adjust the brake pressure independently for each of the plurality of wheels of the vehicle.

As an extension of the inventive concept, it may be possible to further take into account an indication of a road condition ahead of the vehicle and within a predefined area, the road condition requiring the braking action. Thus, in case e.g. a safety functionality implemented with the vehicle identities an obstacle ahead of the vehicle, this information may be taken into account by the inventive concept. The predetermined area may for example be within 1000 meters in front of the vehicle. Other distances are of course possible and within the scope of the invention.

Typically, an activation time for performing the braking action is based on the road condition and the driver alertness level. For example a distance to the obstacle may dictate when to initiate the braking action. Other possible road conditions include upcoming known problematic road sections, curves, intersections, traffic congestions, etc. The indication of a road condition ahead of the vehicle may also possibly be obtained from (previously) received/collected e-horizon information. The e-horizon information could include map data, information about traffic works, hills, etc.

Furthermore, it may in accordance to the invention be possible to determine a desired driver steering device position for the vehicle when performing the braking action, and automatically applying an assisting driver steering device force, where the assisting driver steering device force is based on the desired driver steering device position and the driver reaction level. Accordingly, in case the driver is counteracting the yaw torque by e.g. turning the steering wheel, there could be possible to further assist the driver performing the counteracting action. In an embodiment, this is achieved by means of controlling an engine of an electric power steering to apply an assisted steering wheel torque corresponding to a desired steering wheel angle. In some embodiments also e.g. a small rotation of the steering wheel in the correct direction may be used as an indication of a driver reaction, and the assisting driver steering device force will further help the driver to achieve the desired result of counteracting the yaw torque of the vehicle.

According to another aspect of the present invention there is provided a driver assistance system that includes a brake support function of a vehicle, the vehicle assistance system comprising a control unit, wherein the control unit is configured to receive an indication of a difference in road friction between a left and a right wheel of a plurality of wheels of the vehicle, receive an indication of a level of driver reaction to a braking action, the braking action performed by applying a predetermined brake pressure to the plurality of wheels of the vehicle, and determine an adjusted brake pressure based on the difference in road friction and the driver reaction level. This aspect of the invention provides similar advantages as discussed above in relation to the previous aspect of the invention.

According to a still further aspect of the present invention there is provided a computer program product comprising a computer readable medium having stored thereon computer program means for operating a driver assistance system that includes a brake support function of a vehicle, the computer program product comprising code for receiving an indication of a difference in road friction between a left and a right wheel of a plurality of wheels of the vehicle, code for receiving an indication of a level of driver reaction to a braking action, the braking action performed by applying a predetermined brake pressure to the plurality of wheels of the vehicle, and code for determining an adjusted brake pressure based on the difference in road friction and the driver reaction level. Also this aspect of the invention provides similar advantages as discussed above in relation to the previous aspects of the invention.

The computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
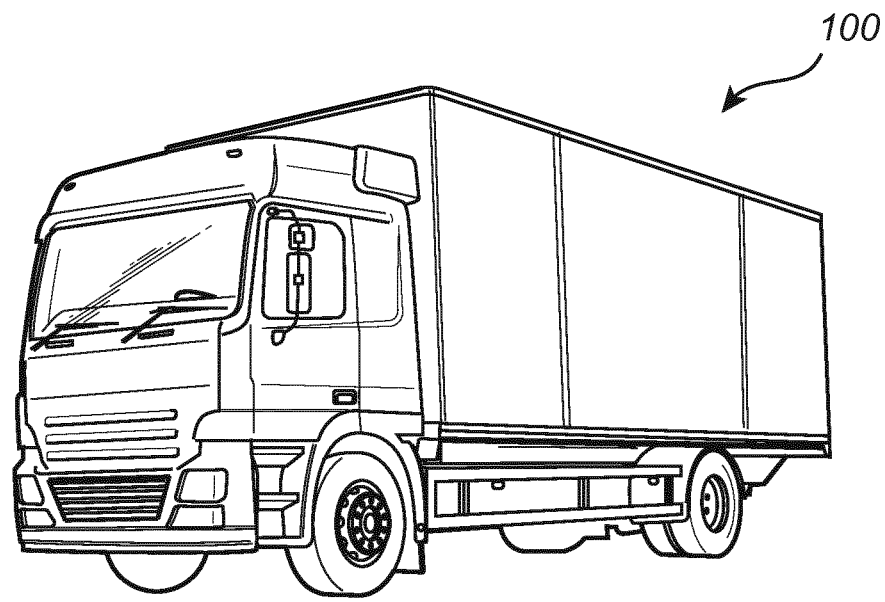
FIG. 1 illustrates a truck comprised with a driver assistance system according to a currently preferred embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein, rather, these embodiments are provided for thoroughness and completeness, and fully convey the scope of the invention to the skilled addressee. Like reference characters refer to like elements throughout.

Figure 2:
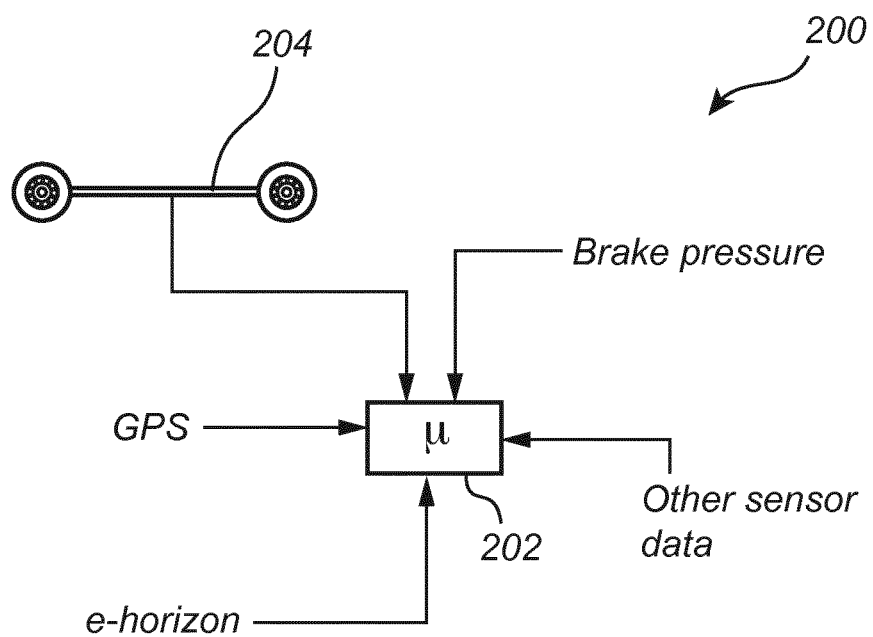
FIG. 2 provides an exemplification of the components of the driver assistance system, and FIG. 3 conceptually illustrates the processing steps for performing the method according to the invention.

Referring now to the drawings and to FIGS. 1 and 2 in particular, there is in FIG. 1 depicted an exemplary vehicle, here illustrated as a truck 100, in which a driver assistance system 200 according to the present invention may be incorporated. The driver assistance system 200 may of course be implemented, possibly in a slightly different way, in a car 100.

The driver assistance system 200 comprises a control unit 202, where the control unit 202 is configured to receive information from components comprised with the truck 100. Such information may for example include a current level of road friction from a wheelset 204, typically acquired by means of e.g. sensors arranged with the wheelset 204. The road friction may for example be determined using optical sensors, cameras, difference in speed rotation, and/or using other known and future methods. The control unit 202 is also configured to receive information relating to a current brake pressure.

The control unit 202 may include a general purpose processor, an application specific processor, a circuit containing processing components, a group of distributed processing components, a group of distributed computers configured for processing, etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein. The control unit 202 may be provided as a separate unit and/or may at least partly form part of an electronic control unit comprised with the truck 100.

The control unit 202 may also be connected to e.g. a communication interface (such as e.g. a CAN bus or similar, or a dedicated communication interface) of the truck 100, preferably for allowing control of elements of the truck, such as for example to control the steering and/or for controlling a brake arrangement of the truck 100. Accordingly, from a determination made by the control unit 202, it may be possible to control the operation of the truck 100, including for example allowing the direction (control the steering) and/or speed (control the brake arrangement) of the truck 100 to be adjusted.

Further components may be connected to the control unit 202, including for example arrangements for determination of the position of the truck 100, such as for example a GPS (global positioning system, or similar) combined with map information, e.g. stored in a local or remote database, and/or e-horizon data stored with the truck 100. The map/e-horizon data may comprise information relating to for example, type of road, and number of traffic lanes and/or any static obstacles on the road.

Figure 3:
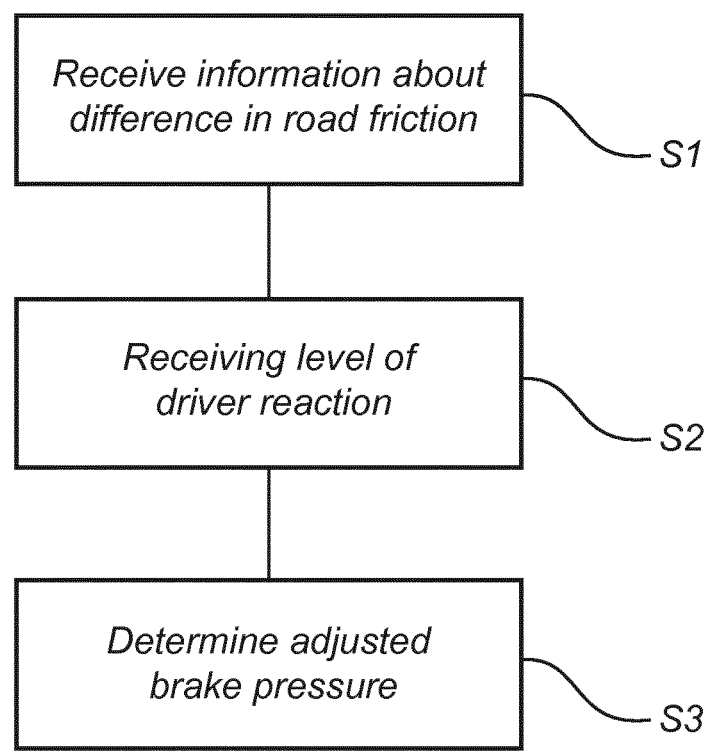

During operation of the driver assistance system 200, with further reference to FIG. 3, the process starts by that the control unit 202 receives, S1, an indication of a difference in road friction between a left and a right wheel of a plurality of wheels of the truck 100, such as wheelset 204. The difference in road friction could have been determined as indicated above. The control unit 202 also receives, S2, an indication of a level of driver reaction to a braking action, the braking action being performed by applying a predetermined brake pressure to the plurality of wheels of the vehicle.

In case the control unit 202 determines that a current steering wheel angle correspond to a counteraction for a yaw torque of the vehicle, due to a difference in road friction, then the control unit 202 will determine, S3, an adjusted brake pressure based on the difference in road friction and the driver reaction level.

In a possible embodiment of the invention, the driver's interaction with a steering wheel and/or a brake pedal comprised with the truck 100 is seen as a driver reaction, and the actual e.g. rotation of the steering wheel is determined by analyzing a steering wheel angle, for example acquired using a thereto provided sensor. The driver reaction is also seen as an estimation of the driver's driver capacity in terms of how much steering the driver is capable of performing in a present state. The capacity and/or skill of the driver may also be used as an input to the driver assistance system 200.

In a possible embodiment the driver assistance system 200 may be pre-set to different skill levels for the driver, including for example a novice driver level, a normal driver level and a skilled driver level. In the novice driver level the driver assistance system 200 is expecting the driver to only provide a slight feedback for counteracting a possible yaw torque, whereas when the driver assistance system 200 is set to the skilled driver level the driver assistance system 200 is expecting the driver be prepared and ready for counteracting a yaw torque in case of split road friction. The skilled driver level may thus, in case of correct response by the driver, allow for a shorter stopping distance, whereas the novice driver level will constrain the driver assistance system 200 to focus on keeping the truck 100 as straight as possible during the braking action. The normal driver level may be somewhere in between the skilled and the novice driver level.

In a possible implementation, the truck 100 is equipped with an arrangement for providing electric power steering, for example including a controllable electrical motor, for providing an assisted steering wheel torque to the driver. Data from the sensor(s) for measuring a current steering wheel angle may be received by the control unit 202 and compared to a desired steering wheel angle, where the desired steering wheel angle is dependent on e.g. a current yaw torque for the truck 100. In case of the driver operating the steering wheel for counteracting the yaw torque, the control unit 202 may determine an assistance steering wheel torque to be applied to the mentioned electrical motor, thereby assisting the driver in providing the adequate counteraction. When the counteraction is provided in the correct manner, the brake pressure applied during the braking action may be further increased and the stopping distance may thus be even further decreased.

Here, the invention has been described using the example braking on split road friction, but the inventive concept may also be used for other purposes where driver capabilities should serve as limits when performing coordination of motion actuators. Examples of motion actuators are: engine, rear-axle steering, trailer steering, electric wheel motors and a retarder.

In summary, the present invention relates to a method for controlling a driver assistance system that includes a brake support function of a vehicle, the method comprising the steps of receiving an indication of a difference in road friction between a left and a right wheel of a plurality of wheels of the vehicle, receiving an indication of a level of driver reaction to a braking action, the braking action performed by applying a predetermined brake pressure to the plurality of wheels of the vehicle, and determining an adjusted brake pressure based on the difference in road friction and the driver reaction level.

Advantages with the invention includes the possibility of shortening the stopping distance for the vehicle by taking into account a driver reaction to a braking action, where a "correct" action by the driver, such as by means of driver steering interaction, allows for a further increase of the brake pressure. In case the driver is not reacting as desired, the focus may be placed on keeping the vehicle as straight and steady as possible. As an example, this means that in case the braking action results in a yaw torque that turns the vehicle about its vertical axis because of a current difference in friction, the braking action can be adjusted to correspond to the action taken by the driver. The inventor has shown that the stopping distance is very much affected by the set capability of the driver to handle the lateral disturbance, as expected. In general the capability of the driver to handle disturbances should be estimated in real-time, considering driver mental state.

In essence, the inventive concept, has the potential of reducing stopping distance at split friction braking when the driver is attentive. In addition, the invention provides a direct way of making sure that the induced lateral pull is manageable for different drivers at different states of alertness.

Still further, the invention provides a way of supporting the driver via a guiding steering torque. The invention depends only on measureable quantities of the vehicle, and can therefore be adopted in various vehicle configurations without extensive tuning.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable, instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for control a driver assistance system that includes a brake support function of a vehicle, the method comprising the steps of:
   receiving an indication of a difference in road friction between a left and a right wheel of a plurality of wheels of the vehicle;
   receiving an indication of a level of driver reaction to a braking action, the first braking action being performed by applying a predetermined brake pressure to the plurality of wheels of the vehicle, wherein the predetermined brake pressure is determined based on an indication of a level of driver alertness;
   determining using a processor, an adjusted brake pressure based on the difference in road friction and the driver reaction level; and
   performing a second braking action by applying the adjusted brake pressure to the plurality of wheels of the vehicle.

2. The method according to claim 1, wherein the driver reaction level includes at least one of an indication of a driver operation of a driver steering device or a brake pedal of the vehicle.

3. The method according to claim 1, wherein the adjusted brake pressure is further based on an allowed yaw disturbance for the vehicle.

4. The method according to claim 1, wherein the adjusted brake pressure is independently determined for each of the plurality of wheels of the vehicle.

5. The method according to claim 1, wherein the brake pressure is continuously adjusted during the braking action.

6. The method according to claim 1, further comprising the step of:
   receiving an indication of a road condition ahead of the vehicle and within a predefined area, the road condition requiring the braking action,
   wherein an activation time fir performing the road condition braking action is based on the road condition and the driver alertness level.

7. The method according to claim 6, wherein the indication of a road condition ahead of the vehicle is obtained from previously received e-horizon information.

8. The method according to claim 1, further comprising the steps of:
   determining a desired driver steering device position for the vehicle when performing the braking action, and automatically applying an assisting driver steering device force, where the assisting driver steering device force is based on the desired driver steering device position and the driver reaction level.

9. The method according to claim 8, wherein the driver steering device position is a steering wheel angle and the assisting driver steering device force relates to an applied steering wheel torque.

10. The method according to claim 9, further comprising the step of:
controlling a motor of an electric power steering arrangement based on the assisting driver steering wheel force.

11. A driver assistance system that includes a brake support function of a vehicle, the vehicle assistance system comprising
a control unit comprising a processor,
a driver drowsiness detection system comprised with the vehicle and arranged in communication with the control unit,
wherein the control unit is configured to:
receive an indication of a difference in road friction between a left and a right wheel of a plurality of wheels of the vehicle;
receive an indication of a level of driver reaction to a first braking action, the first braking action performed by applying a predetermined brake pressure to the plurality of wheels of the vehicle, wherein the predetermined brake pressure is determined based on the driver alertness level;
determine a level of driver alertness based on data received from the driver drowsiness detection system;
determine, via the processor, an adjusted brake pressure based on the difference in road friction and the driver reaction level; and
control the brake support function to perform a second braking action by applying the adjusted brake pressure to the plurality of wheels of the vehicle.

12. The driver assistance system according to claim 11, wherein the control unit is connected to sensors arranged with the plurality of wheels of the vehicle and adapted to determining the road friction for each of the plurality of wheels.

13. The driver assistance system according to claim 11, wherein the control unit is connected to sensors adapted for monitoring at least one of a steering wheel angle and a brake pedal position, and the control unit is further configured to determine the level of driver reaction based on at least one of the steering wheel angle and brake pedal position.

14. The driver assistance system according to claim 11, wherein the control unit further arranged in communication with a detection arrangement provided with the vehicle and configured to identify a road condition ahead of the vehicle and within a predefined area, the road condition requiring the braking action, wherein the control unit is further configured to determine an activation time for performing the braking action based on the road condition and the driver alertness level.

15. A vehicle, comprising a driver assistance system according to claim 11.

16. A computer program product comprising a computer readable medium having stored thereon a computer program for operating a driver assistance system that includes a brake support function of a vehicle, the computer program product being configured
to receiving an indication of a difference in road friction between a left and a right wheel of a plurality of wheels of the vehicle, wherein the predetermined brake pressure is determined based on an indication of a level of driver alertness;
to receiving an indication of a level of driver reaction to a first braking action, the first braking action being performed by applying a predetermined brake pressure to the plurality of wheels of the vehicle;
to determine, via a processor, an adjusted brake pressure based on the difference in road friction and the driver reaction level; and
to control the brake support function to perform a second braking action by applying the adjusted brake pressure of the plurality of wheels of the vehicle.

* * * * *